(12) United States Patent
Gilbrech et al.

(10) Patent No.: US 8,010,820 B1
(45) Date of Patent: Aug. 30, 2011

(54) CONTROLLING MULTIPLE-RADIO WIRELESS COMMUNICATION ACCESS POINTS WHEN USING POWER OVER ETHERNET

(75) Inventors: Sid Gilbrech, Sunnyvale, CA (US); Srinivas Sivaprakasam, Fremont, CA (US); Srinath Sarang, Cupertino, CA (US)

(73) Assignee: Meru Networks, Sunnyvale, CA (US)

( * ) Notice: Subject to any disclaimer, the term of this patent is extended or adjusted under 35 U.S.C. 154(b) by 733 days.

(21) Appl. No.: 11/897,001

(22) Filed: Aug. 28, 2007

(51) Int. Cl.
*G06F 1/26* (2006.01)

(52) U.S. Cl. ........ 713/324; 713/300; 713/320; 713/323; 713/340

(58) Field of Classification Search ................... 713/324
See application file for complete search history.

(56) References Cited

U.S. PATENT DOCUMENTS

| | | | |
|---|---|---|---|
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,954,177 B2 | 10/2005 | Channabasappa et al. | |
| 7,006,815 B2 * | 2/2006 | Lehr et al. | 455/343.6 |
| 7,058,367 B1 * | 6/2006 | Luo et al. | 455/101 |
| 7,155,262 B2 * | 12/2006 | Shoobridge | 455/574 |
| 7,155,622 B2 * | 12/2006 | Mancey et al. | 713/324 |
| 7,159,129 B2 * | 1/2007 | Pincu et al. | 713/300 |
| 7,417,974 B2 * | 8/2008 | Hansen | 370/334 |
| 7,567,579 B2 * | 7/2009 | Korcharz et al. | 370/401 |
| 7,631,201 B2 * | 12/2009 | Hansalia | 713/300 |
| 2004/0082356 A1 * | 4/2004 | Walton et al. | 455/522 |
| 2004/0204071 A1 * | 10/2004 | Bahl et al. | 455/557 |
| 2005/0078422 A1 * | 4/2005 | Pincu et al. | 361/62 |
| 2005/0237971 A1 * | 10/2005 | Skraparlis | 370/329 |
| 2006/0013175 A1 * | 1/2006 | Lee | 370/338 |

\* cited by examiner

*Primary Examiner* — Nitin C Patel

(74) *Attorney, Agent, or Firm* — Swernofsky Law Group PC

(57) ABSTRACT

An access point coupled to an Ethernet port detects whether it is using power over Ethernet, and if so, adjusts its operation to maintain its power requirements within those capable of being supplied by power over Ethernet. The access point might include a detector capable of determining if external power is available, or if that access point is operating using power over Ethernet. If the access point is operating using power over Ethernet, it adjusts the operation of its radios, gracefully degrading those radios from (first) both radios operating in 3x3 mode, to (second) a first radio operating in 3x3 mode and a second radio operating in 2x2 mode, to (third) both radios operating in 2x2 mode. The power adaptation circuit may also throttle clock speeds in the system (processor or peripherals), or shut down or idle various peripherals to lower power consumption for the duration consumption is high.

11 Claims, 2 Drawing Sheets

Figure 1:
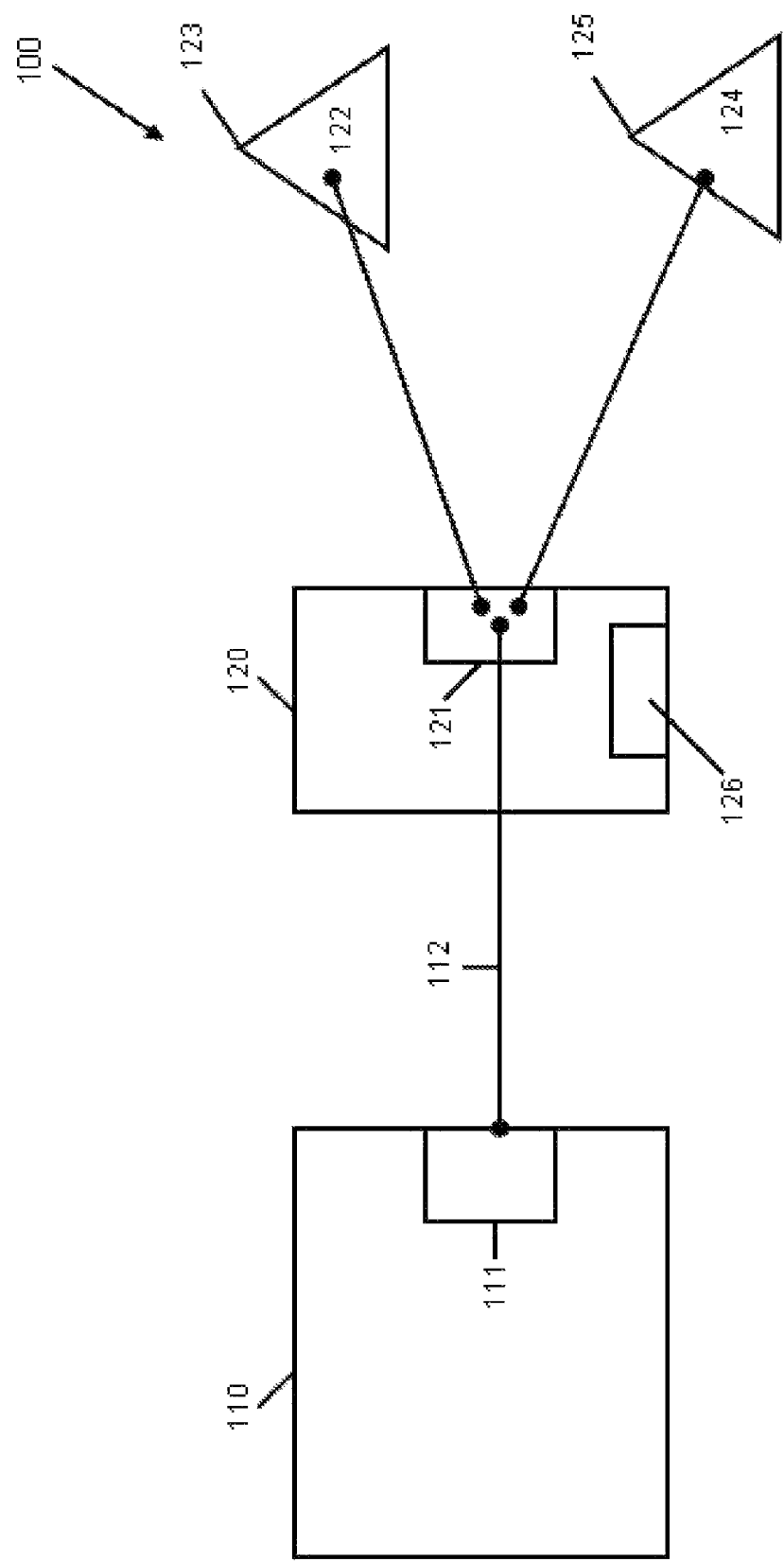

CONTROLLING MULTIPLE-RADIO WIRELESS COMMUNICATION ACCESS POINTS WHEN USING POWER OVER ETHERNET

BACKGROUND

In wireless communication systems using the 802.11n, and possibly other communication protocols, access points sometimes operate more than one radio. Access points are also sometimes coupled to Ethernet switches, from which they may draw both informational data and power, the latter including approximately 15 Watts per Ethernet switch port. With an approximate 2 Watt, or sometimes greater, loss between the Ethernet switch port and the access point, the access point is al- is allowed approximately 12½ Watts to approximately 13 Watts of operating power. This type of operation is sometimes called "power over Ethernet".

One problem in the known art is that when access points operate using more than one radio, in particular when they operate using two radios, the power draw required to operate this radio system may exceed the amount of power available using power over Ethernet. For example, an access point in one particular operational mode might use 6 Watts of power for baseboard operation, plus approximately 3.5 Watts, or slightly more, for operation for each of two radios, a total of approximately 13 Watts, or slightly more, of operating power used for operation of the access point in that mode.

A first known solution is to provide that access points operate only in those modes in which power over Ethernet provides sufficient power for operating those radios the access point intends to operate. One such configuration is for the access point to operate only one radio in 802.11b/g mode and only one radio in 802.11n mode. While this known method achieves the general goal of allowing access points to operate using power over Ethernet, it has the drawback that the capability of access point is not fully utilized.

A second known solution is to provide a separate power source to the access point, e.g., by drawing a separate power transmission line from the Ethernet port to the access point. This has the effect that the access point can operate using this separate power transmission line, without substantial limitation due to power over Ethernet considerations. While this known method achieves the general goal of goal of allowing access points to operate using more power than would be provided using power over Ethernet, it has the drawback that the use of an additional transmission line can be unduly expensive.

DESCRIPTION OF THE EMBODIMENT

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to $1^{st}$ contemplated causes or effects for some implementations do not preclude other causes or effects that might occur in other implementations, even if completely contrary, where circumstances would indicate that the $1^{st}$ contemplated causes or effects would not be as determinative of the structures or techniques to be selected for actual use.

References to $1^{st}$ reasons for using particular structures or techniques do not preclude other reasons or other structures or techniques, even if completely contrary, where circumstances would indicate that the $1^{st}$ structures or techniques are not as compelling. The invention includes those other reasons or other structures or techniques, especially where circumstances would indicate they would achieve the same effect or purpose as the $1^{st}$ reasons, structures, or techniques.

Overview of the Description

An access point coupled to an Ethernet port might operate using external power or power over Ethernet. The access point detects whether it is using power over Ethernet, and if so, adjust its operation so as to maintain its power requirements within those capable of being supplied by power over Ethernet.

In one embodiment, the access point includes a detector capable of determining if external power is available, or if that access point is operating using power over Ethernet. In the event that the access point is operating using power over Ethernet, it adjusts the operation of its radios, gracefully degrading those radios from (first) both radios operating in 3×3 mode, to (second) a first radio operating in 3×3 mode and a second radio operating in 2×2 mode, to (third) both radios operating in 2×2 mode, etc.

TERMS AND PHRASES

Read this application with the following terms and phrases in their most general form. The general meaning of each of these terms or phrases is illustrative, not in any way limiting.

The phrase "access point", and variants thereof, generally refers to any device capable of being coupled to one or more mobile or fixed stations and capable of being coupled to another medium. Although this application provides greater detail regarding embodiments in which access points primarily operate using an IEEE 802.11 protocol variant, there is no particular reason to limit any part of this application in this regard.

The phrase "Ethernet switch", and variants thereof, generally refers to any device capable of coupling devices to an Ethernet network. The phrase "Ethernet port", and variants thereof, generally refers to any portion of an Ethernet switch capable of being coupled to a device with the effect of communication with an Ethernet network. Although this application provides greater detail regarding embodiments in which the coupled network uses an Ethernet protocol, there is no particular reason to limit any part of this application in this regard.

The phrase "power over Ethernet", and variants thereof, generally refers to any technique in which operating power for a device is supplied in conjunction with a data connection from an Ethernet switch port. Although this application provides greater detail regarding embodiments in which the coupled switch includes an Ethernet switch port or an Ethernet switch, there is no particular reason to limit any part of this application in this regard.

The phrases "3×3 mode", "2×2 mode", and variants thereof, generally refer to modes by which an access point might operate one or more radios. Although this application provides greater detail regarding embodiments in which an access point uses an IEEE 802.11 protocol variant, there is no particular reason to limit any part of this application in this regard.

FIGURES AND TEXT

FIG. 1

A FIG. 1 shows a block diagram of a system.

A system 100 includes elements as represented in the FIG. 1, including at least: at least one Ethernet switch element 110, and one or more access points 120.

The Ethernet switch element 110 includes one or more Ethernet ports 111, one or more of them including a powered link 112 between its associated Ethernet port 111 and an access point 120 coupled thereto.

The one or more access points 120 each include an input port 121, each of which couples that particular access point 120 to its corresponding Ethernet port 111, a first radio 122 including a first radio antenna 123, a second radio 124 including a second radio antenna 125, and a power-detection circuit 126.

Either the first radio 122 and its first radio antenna 123, or the second radio 124 and its first radio antenna 123, might be configured to operate in either 3×3 mode or 2×2 mode.

In a 3×3 mode, the radio 122 and its first radio antenna 123, or the second radio 124 and its first radio antenna 123, might be configured to include three transmit chains and three receive chains. These might include separate subfrequencies in a single frequency band. This has the effect that each of the antennas includes more than one physical omnidirectional antenna, situated sufficiently distant (e.g., more than ½ wavelength apart) to avoid radio interference.

Similar to the 3×3 mode, in a 2×2 mode, the radio 122 and its first radio antenna 123, or the second radio 124 and its first radio antenna 123, might be configured to include two transmit chains and two receive chains. These might include separate subfrequencies in a single frequency band. This has the effect that each of the antennas include more than one physical antenna, situated sufficiently distant (e.g., more than ½ wavelength apart) to avoid radio interference.

The access point 120 might use approximately 6 Watts of power for baseboard operation. In addition, the access point 120 might use differing amounts of power operation for its first radio 122 and its second radio 123.

When either the first radio 122 or the second radio 123 is operating in a 3×3 operational mode, a radio might use approximately 3.5 Watts power, or slightly more. When both the first radio 122 and the second radio 123 are operating in 3×3 operational mode, the combined power usage can exceed power available using power over Ethernet.

When both the first radio 122 or the second radio 123 are operating in a 2×2 operational mode, a radio might use approximately 2.5 Watts power, or slightly less, for each such radio. In such cases, the combined power usage should not generally exceed power available using power over Ethernet.

As noted above, the access point 120 includes a power-detection circuit 126. In one embodiment, the power-detection circuit 126 includes a resistor disposed in series between a high voltage element and a grounding element. This has the effect that a voltage drop across that resistor provides information regarding how much power is available for the access point 120.

If the power-detection circuit 126 determines that the access point 120 has a supplemental source, i.e., that the access point 120 is not constrained due to power over Ethernet considerations, the access point 120 might determine to operate both its first radio 122 including its first radio antenna 123, and its second radio 124 including its second radio antenna 125, in 3×3 mode. This has the effect that there is no special requirement to maintain the access point 120 operational within constraints due to power over Ethernet considerations.

If the power-detection circuit 126 determines that the access point 120 does not have a supplemental source, i.e., that the access point 120 is constrained due to power over Ethernet considerations, the access point 120 determines what power limitations apply to its operation of its first radio 122 including its first radio antenna 123 and its second radio 124 including its second radio antenna 125.

Although this application provides more detail with regard to power-limited techniques subject to constraints due to power over Ethernet considerations, in the context of the invention, there is no particular requirement to so limit the access point 120 or the nature of the invention. For example, if the access point 120 is using an alternative method other than power over Ethernet, but that alternative method has power constraints of its own, the access point 120 proceeds similarly to determine if it should operate in a power-limited manner, subject to the constraints of that alternative method.

If the access point 120 determines that it might operate both its first radio 122 including its first radio antenna 123 and its second radio 124 including its second radio antenna 125 non-concurrently, i.e., without simultaneously drawing their maximum power requirements, the access point 120 might determine that to operate both its first radio 122 including its first radio antenna 123, and its second radio 124 including its second radio antenna 125, in 3×3 mode. This has the effect that, while the access point 120 must maintain operational within constraints due to power over Ethernet considerations, those constraints are adequate for operating both the first radio 122 including its first radio antenna 123, and the second radio 124 including its second radio antenna 125, in 3×3 mode non-concurrently.

If the access point 120 determines that both its first radio 122 including its first radio antenna 123 and its second radio 124 including its second radio antenna 125 are called upon to operate concurrently, and that the access point 120 is simultaneously constrained by due to power over Ethernet considerations, the access point 120 attempts to degrade operation of its radios and antennas gracefully from 3×3 mode to 2×2 mode. It may also reduce the power output of the radios or switch off the power amplifier, or reduce power consumption in any other way. For example the processor peripheral devices might not be used during the time that the power consumption remains high.

In one embodiment, the access point 120 determines if it has adequate power to operate one radio and antenna, e.g., its first radio 122 including its first radio antenna 123, in 3×3 mode, while concurrently operating the other radio and antenna, e.g., its second radio 124 including its second radio antenna 125, in 2×2 mode, the access point 120 attempts to operate its radios and antennas in that partially degraded mode. This has the effect that the access point 120 makes as full advantage of its radios and antennas as it can, subject to any constraints due to power over Ethernet considerations.

In one embodiment, the access point 120 determines if it does not have adequate power to operate one radio and antenna, e.g., its first radio 122 including its first radio antenna 123, in 3×3 mode, while concurrently operating the other radio and antenna, e.g., its second radio 124 including its second radio antenna 125, in 2×2 mode. In such cases, the access point 120 attempts to operate its radios and antennas both in 2×2 mode. This also has the effect that the access point 120 makes as full advantage of its radios and antennas as it can, subject to any constraints due to power over Ethernet considerations.

FIG. 2

Figure 2:
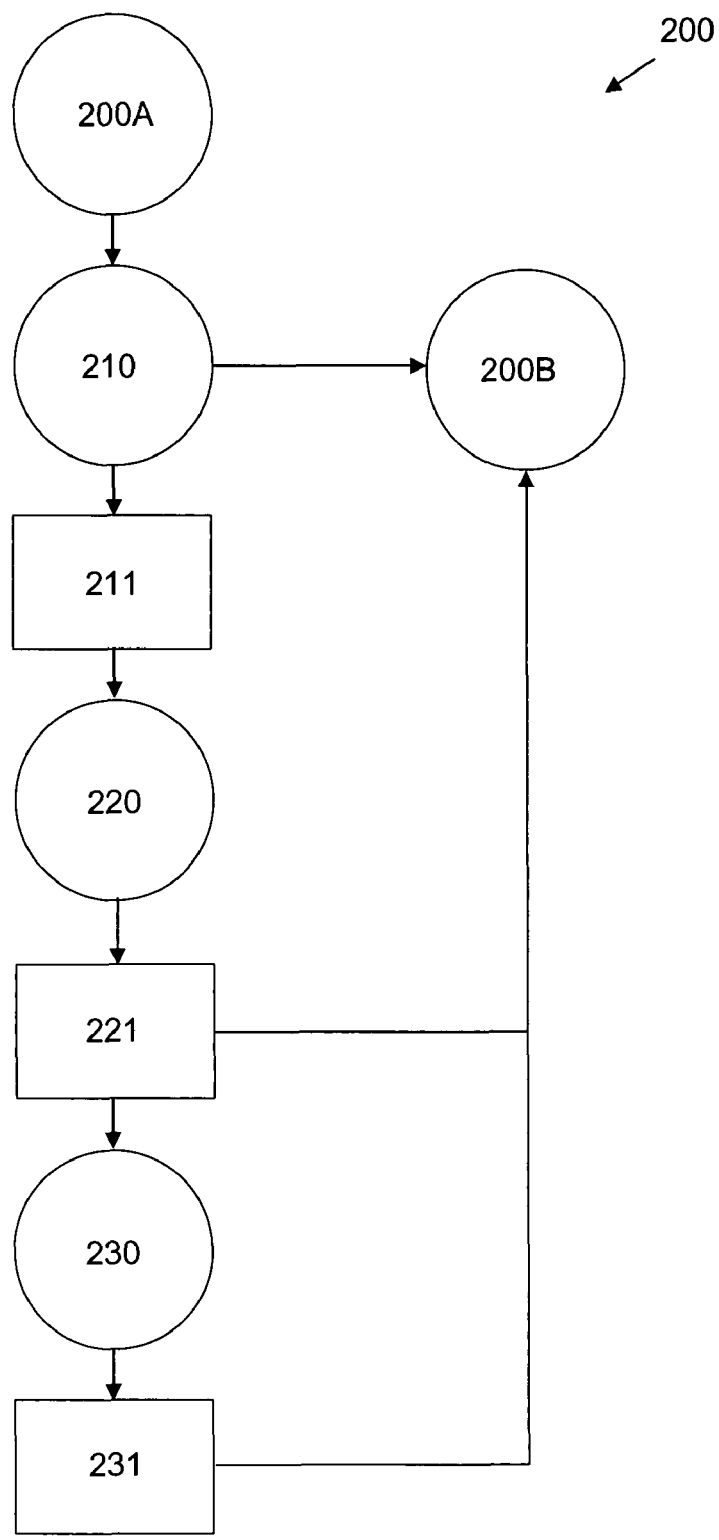

A FIG. 2 shows a process flow diagram of a method.

A method 200 includes flow markers and process steps as represented in the FIG. 2, including at least the following:

Beginning of Method

A flow marker 200A indicates a beginning of the method 200.

The method proceeds with a flow marker 210.

Determining Power Constraints

A flow marker 210 indicates that the method 200 is ready to determine power constraints.

At a step 211, the power-detection circuit 126 determines whether the access point 120 is operating under a limited power constraint.

If the power-detection circuit 126 determines that the access point 120 is not operating under a limited power constraint, there is no particular requirement to limit power use by the radios and antennas, and the method 200 proceeds with the flow marker 200B.

If the power-detection circuit 126 determines that the access point 120 is operating under a limited power constraint, e.g., a set of constraints due to power over Ethernet considerations, the method 200 might need to limit power use by the radios and antennas, and the method 200 proceeds with the flow marker 220.

Determining Concurrent Radio and Antenna Use

A flow marker 220 indicates that the method 200 is ready to determine concurrent radio and antenna use.

At a step 221, the access point 220 determines if it will operate with concurrent radio and antenna use by its first radio 122 including the first radio antenna 123, and its second radio 124 including the second radio antenna 125.

If the access point 220 determines if it will not operate with concurrent radio and antenna use, as described above, there is no particular requirement to limit power use by the radios and antennas, and the method 200 proceeds with the flow marker 200B.

If the access point 220 determines if it will operate with concurrent radio and antenna use, as described above, the method 200 might need to limit power use by the radios and antennas, and the method 200 proceeds with the flow marker 230.

Limiting Concurrent Radio and Antenna Power Use

A flow marker 230 indicates that the method 200 is ready to limit concurrent radio and antenna use.

At a step 231, the access point 220 determines whether it will be able to operate subject to power use considerations, using a first radio and antenna in 3×3 mode and a second radio and antenna in 2×2 mode.

If the access point 220 determines that it will be able to operate using a first radio and antenna in 3×3 mode and a second radio and antenna in 2×2 mode, the access point 220 sets a first radio and antenna to operate in 3×3 mode, and sets a second radio and antenna to operate in 2×2 mode. The method 200 proceeds with the flow marker 200B.

If the access point 220 determines that it will not be able to operate using a first radio and antenna in 3×3 mode and a second radio and antenna in 2×2 mode, the access point 220 sets both radios and antennas to operate in 2×2 mode. The method 200 proceeds with the flow marker 200B.

End of Method

A flow marker 200B indicates an end of the method 200.

ALTERNATIVE EMBODIMENTS

After reading this application, those skilled in the art will recognize that the invention has wide applicability, and is not limited to the embodiments described herein.

The invention claimed is:

1. A method, including steps of
at an access point in a communication system,
   at least a portion of said communication system using wireless communication,
   said access point being subject to one or more power constraints,
   said power constraints being responsive to
   power supplied in conjunction with a data connection;
measuring one or more power constraints to which said access point is subject; and
responsive to said steps of measuring,
   for a $1^{st}$ one of a plurality of radios coupled to said access point,
   selecting an operational mode in which said $1^{st}$ radio continues operation,
with the effect that
   said $1^{st}$ radio draws power while in operation in accord with said power supplied in conjunction with a data connection.

2. A method as in claim 1, wherein
said operational mode selected for said $1^{st}$ radio
is selected from the group
a 2×2 operational mode, a 3×3 operational mode.

3. A method as in claim 1, including steps of
responsive to said steps of measuring,
   for a $1^{st}$ and a $2^{nd}$ one of a plurality of radios coupled to said access point,
   selecting a $1^{st}$ operational mode in which said $1^{st}$ radio continues operation,
   selecting a $2^{nd}$ operational mode in which said $2^{nd}$ radio continues operation,
   said $1^{st}$ and $2^{nd}$ operational mode being substantially distinct,
with the effect that
   a combined operation of said $1^{st}$ and $2^{nd}$ radios
   draw relatively less power while in operation.

4. A method as in claim 1, including steps of
responsive to said steps of measuring,
   for a $2^{nd}$ one of a plurality of radios coupled to said access point,
   selecting an operational mode in which said $2^{nd}$ radio continues operation,
with the effect that
   said $2^{nd}$ radio draws relatively less power while in operation.

5. A method as in claim 1, wherein
said operational protocol includes
   a plurality of operational modes,
   each said operational mode specifying a selected number of antennae; and
said steps of selecting said operational protocol
   include steps of
   selecting one of said operational modes.

6. A method as in claim 1, wherein
said operational mode includes
   a specification of a selected number of antennae used by said $1^{st}$ one radio; and
said operational mode includes
   a specification of a selected number of antennae used by a receiver of a signal from said $1^{st}$ one radio.

7. A method, including steps of
at an access point in a communication system,
   said access point having a plurality of radios coupled thereto,
   each said radio having a plurality of antennae coupled thereto,
   said access point being subject to one or more power constraints,
      said power constraints being responsive to
      power supplied in conjunction with a data connection;
measuring one or more power constraints to which said access point is subject; and
responsive to said steps of measuring,
   selecting, for substantially each said radio,
   a number of said antennae for concurrent operation
wherein an operational mode for each said selected radio is substantially otherwise unchanged.

8. A method as in claim 7, wherein
said number of antennae selected for substantially each said radio
is associated with an operational mode selected from the group
a 2×2 operational mode, a 3×3 operational mode.

9. A method as in claim 7, wherein
at said access point,
said number of antennae for a $1^{st}$ said radio
is substantially distinct from
a number of antennae for a $2^{nd}$ said radio.

10. A method as in claim 7, wherein
for a $1^{st}$ said radio,
   said number of antennae are coupled to a $1^{st}$ switch capable of determining a $1^{st}$ operational mode,
for a $2^{nd}$ said radio,
   said number of antennae are coupled to a $2^{nd}$ switch capable of determining a $1^{st}$ operational mode,
said $1^{st}$ and $2^{nd}$ switches are capable of operating substantially independently.

11. A method as in claim 7, wherein
for a $1^{st}$ said radio,
   said number of antennae transmit distinct signals
   to a substantially equivalent number of antennae receiving those distinct signals.

\* \* \* \* \*